Sept. 30, 1947.  S. A. SCHERBATSKOY  2,428,180
PHASE MEASURING SYSTEM EMPLOYING FREQUENCY MODULATION
Filed Oct. 30, 1943

INVENTOR

Serge Alexander Scherbatskoy

Patented Sept. 30, 1947

2,428,180

UNITED STATES PATENT OFFICE 2,428,180

PHASE MEASURING SYSTEM EMPLOYING FREQUENCY MODULATION

Serge Alexander Scherbatskoy, Tulsa, Okla.

Application October 30, 1943, Serial No. 508,358

4 Claims. (Cl. 172—245)

My invention relates to a method and means for indicating the relative phase displacement of two alternating voltages of the same frequency, which is equivalent to a determination of the time interval between the occurrence of the two voltages. My invention relates also to the application of the above method and means in various problems involving phase measurements.

It is well known that in many applications it is desirable or necessary to determine the relative phase of two voltages. A great many procedures have been devised to accomplish this purpose. However, I am not aware of any means which accomplishes this end in as precise manner as that which is proposed by my invention.

A broad object of my invention is to provide a simple and inexpensive system for indicating with an extreme accuracy and precision very slight phase differences of two varying voltages or currents.

Another object is to simplify and reduce the expense of phase measuring systems.

Other specific objects and features of the invention will become apparent from the detailed description to follow.

The system of the present invention differs fundamentally from all previous phase measuring systems. In the present method I am converting the two voltages to be compared into two frequency modulated high frequency currents and am measuring the phase difference between the two voltages by determining the frequency difference between the two high frequency currents. I am therefore translating the phase difference which I wish to measure into a frequency difference and am utilizing a frequency measuring system in order to measure the phase. The art of measuring frequencies has already attained a very highly developed stage, and the present invention allows me to utilize all the achievements of the frequency measuring technique for precise and accurate determinations of the phase differences.

The manner in which I determine these phase differences, and in which I solve various problems involving the technique of precise phase difference measurements will now be explained with reference to the drawings in which.

Consider two voltages which are designated respectively as $e_1 = E \sin \omega_0 t$ and $e_2 = E \sin (\omega_0 t - \phi)$. Both voltages have the same amplitude $E$ and frequency $\omega_0$ but are displaced in phase by an amount $\phi$. Let the phase difference $\phi$ between $e_1$ and $e_2$ be the unknown quantity that it is desired to determine. The voltages $e_1$ and $e_2$ are represented in Fig. 1 as the output voltages of two generators designated by the numerals 20 and 21.

Figure 1:
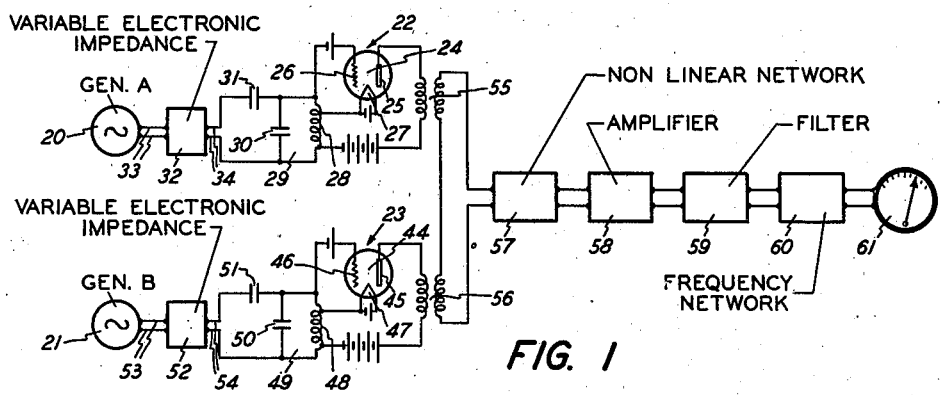
Fig. 1 is a schematic circuit diagram of a phase measuring system in accordance with my invention.

The system shown in Fig. 1 comprises two identical high frequency oscillators 22 and 23. The oscillator 22 comprises an ordinary three electrode tube 24 containing plate 25 grid 26 and filament 27. The plate circuit of the triode is coupled with the grid circuit by the inductance 28 which inductance forms part of the tuned circuit 29 of the oscillator 22. The tuned circuit of the oscillator also includes a fixed condenser 30 in parallel with the inductance 28 and a circuit consisting of another fixed condenser 31 in series with an electronic impedance 32. The electronic impedance is schematically designated by a block and is described more fully in connection with Fig. 4. The electronic impedance is provided with input terminals 33 and output terminals 34 and is designed in such a manner that the value of the impedance between the terminals 34 is determined by the controlling voltage applied across the input terminals 33. The controlling voltage applied across the terminals 33 is the voltage $e_1 = E \sin \omega_0 t$. Therefore, the impedance 32 varies with the frequency $\omega_0$ in synchronism with $e_1$ and consequently the natural frequency of the tuned circuit varies with the frequency $\omega_0$ in synchronism with $e_1$.

The oscillator 23 is identical in its structure to the oscillator 22 and the corresponding elements in the circuits of the oscillators 22 and 23 have identical values. Thus the oscillator 23 comprises a triode tube 44 corresponding to 24 containing plate 45, grid 46 and filament 47. The plate circuit of the triode 44 is coupled with the grid circuit by the inductance 48 corresponding to the inductance 28 which inductance forms part of the tuned circuit 49 of the oscillator 23. The tuned circuit also includes a fixed condenser 50 corresponding to 30 in parallel with the inductance 28 and a circuit consisting of another condenser 51 corresponding to 31 in series with an electronic impedance 52 corresponding to 32, the said circuit being in parallel with the inductance 48. The electronic impedance is schematically designated by a block and is described more fully in connection with Fig. 4. The electronic impedance is provided with output terminals 54 connected to the tuned circuit 49 and input terminals 53 connected to the generator 21, the said generator providing the controlling voltage $e_2 = E \sin(\omega_0 t - \phi)$. Therefore the natural frequency of the tuned circuit 49 varies with the frequency $\omega_0$ in synchronism with $e_2$. Consequently the frequency variation with respect to time of the tuned circuit 49 of the oscillator 23 is displaced with respect to the frequency variation of the tuned circuit 29 of the oscillator 22 by a time interval $t = \phi/\omega_0$. In the present case the frequency of the oscillators 22 and 23 may be for instance 30 megacycles and they may be so adjusted as to vary over a range of about 10 percent of the normal value.

The output of the oscillators 22 and 23 are respectively transmitted by means of transformers 55 and 56 respectively to the input terminals of a non-linear network 57. The non-linear network 57 is of a square law type, i. e., it has a curvature of such value that the terms higher than the second degree may be neglected. The network 57 will produce across its output terminals frequencies which fall in the four following groups: (A) Identical to the impressed frequencies. (B) Frequencies that are twice the instantaneous frequencies generated by the oscillators 22 and 23. (C) Frequencies which are equal to the sum of the instantaneous frequency derived from the oscillator 22 and the instantaneous frequency derived from the oscillator 23. (D) Frequencies which are equal to the difference between the instantaneous frequency of the oscillator 22 and the instantaneous frequency of the oscillator 23.

The above signals are derived from the output of the non-linear network 57, then amplified in the amplifier 58 and subsequently transmitted to the filter 59. The filter 59 is of a low pass type and its cut off frequency is so determined as to attenuate the signals A, B and C. Consequently, only the signal D representing the difference between the frequencies of the oscillators 22 and 23 is being transmitted to the frequency metering circuit 60.

The frequency metering circuit 60 is of a type well known in the art which produces in the output terminals a current the magnitude of which is proportional to the frequency of the signal applied across its input terminals. Consequently, the current produced in the output terminals of 60 is equal in magnitude to the frequency difference between the oscillators 22 and 23. The frequency metering circuit is in turn connected to the indicator 61 which gives the value of the output current of 60.

Figure 2:
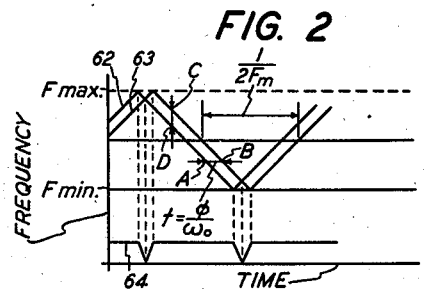
Fig. 2 shows curves explaining the operation of my phase measuring system.

The fundamental principles of the system may be understood by reference to the explanatory diagram of Fig. 2 in connection with Fig. 1. In this diagram, instantaneous frequencies in cycles per second are plotted as ordinates against time in seconds as abscissa. The line 62 shows the variation of the frequency of the oscillator 22 and the line 63 the variation of the frequency of the oscillator 23. The ordinates show the frequencies generated by 22 and 23 for any particular instant of time.

It has been shown in the preceding paragraphs that the instantaneous frequency generated by the oscillator 22 depends upon the instantaneous value of the electronic impedance 32 inserted in its tuned circuit 29. The electronic impedance 32 is being controlled by the voltage $e_1 = E \sin \omega_0 t$ and varies in synchronism with this voltage. Consequently the frequency of the oscillator varies periodically between two extremes $F_{max}$ and $F_{min}$ with the rate of $F_m$ times per second where $$F_m = \frac{\omega_0}{2\pi} \qquad (1)$$

Therefore the instantaneous frequency of the signal generated by 22 varies with time as shown by the saw-toothed shaped line 62.

In the similar manner the instantaneous value of the voltage $e_2 = E \sin(\omega_0 t - \phi)$ determines the instantaneous value of the electronic impedance 52 and consequently the instantaneous value of the output frequency of the oscillator 23. Therefore, the frequency of the oscillator 23 is modulated by the amplitude of the voltage $e_2$. The output of the oscillator 23 is represented diagrammatically by the saw-toothed shaped line 62.

By examining the circuit diagrams of the oscillators 22 and 23 it becomes apparent that the conditions to which these two oscillators are subjected are identical with the difference that the controlling voltage $e_2$ has a phase shift with respect to $e_1$ of $\phi$ electrical degrees and therefore various occurrences in both circuits are same, but they are shifted with respect to time by an amount of $\phi/\omega_0$ seconds. Therefore, the line 63 is displaced to the right by a time interval equal to $\phi/\omega_0$ with respect to the line 62. It is apparent that the segment AB representing the time delay between 62 and 63 is proportional to the phase difference $\phi$ which is to be measured.

By inspecting Fig. 2 it can be readily seen that the segment CD representing the instantaneous frequency difference $f$ between the signals 62 and 63 is proportional to the segment AB representing the phase difference $\phi$ between the signals. Accordingly in my invention I am measuring the phase difference $\phi$ between the signals 62 and 63 by determining the frequency difference between the signals 62 and 63.

My invention consists therefore essentially in translating phase differences into frequency differences, and considering the frequency difference as an index of the phase difference.

As illustrated in Fig. 1, the output of the oscillators 22 and 23 is applied to the non-linear network 57 wherein the signals A, B, C and D referred to in the preceding paragraphs are between produced. Of these four signals the signals A, B and C are being completely attenuated in the low pass filter 59 and only the signal D appears across the output terminals of the filter 59. This signal is being subsequently applied to the frequency metering network 60 and therefore in the output terminals of the network 60 there appears a current the magnitude of which represents the frequency difference between the signals 62 and 63. This voltage is indicated on the meter 61.

Consider now again the signals 62 and 63 of Fig. 2 representing the frequency modulated outputs of the oscillators 22 and 23.

The time delay $t = \phi/\omega_0$ shown in the diagram has been greatly exaggerated in comparison with the time interval of the modulating frequency in order to make the description clear.

The signal D has been diagrammatically represented by means of the line 64 in Fig. 2. This signal has a predominant frequency $f$ representing the frequency difference between the waves 62 and 63 over the larger portion of each half cycle of frequency modulation. It is apparent, however, that at and near the points where lines 62 and 63 cross the frequencies of the two waves coincide. Then irregularities occur in the beat frequency represented by the curve 64 resulting from the combination of the waves represented by curves 62 and 63 in that the beat frequency goes to zero and returns to its value $f$. From Fig. 2 it may be seen that these irregularities will be small if $$t = \frac{\phi}{\omega_0}$$

is small compared to $$\frac{1}{2F_m}$$

The number of cycles of frequency modulation $F_m$ is so chosen that $t=\phi/\omega_0$ is always very small compared to $\frac{1}{2} F_m$. Under these circumstances the average difference $f_{av}$ is directly proportional to the phase $\phi$ and may be found in terms of the symbols defined above from the following equation:

$$f_{av} = 4(F_{max} - F_{min}) \times F_m \times t = \frac{2}{\pi}(F_{max} - F_{min})\phi \quad (2)$$

Formula 2 shows the proportionality between the phase angle $\phi$ and the frequency difference $f_{av}$ indicated by the meter 61. The constant of proportionality K should be taken into consideration when translating the reading of the meter 61 into reading of the phase difference.

It is therefore apparent that I have provided a system and a method for measuring with a very great precision the phase differences between two electrical signals.

While the curves show the transmitter frequency varying linearly with time, this is not essential to the operation of the system.

Figure 3:
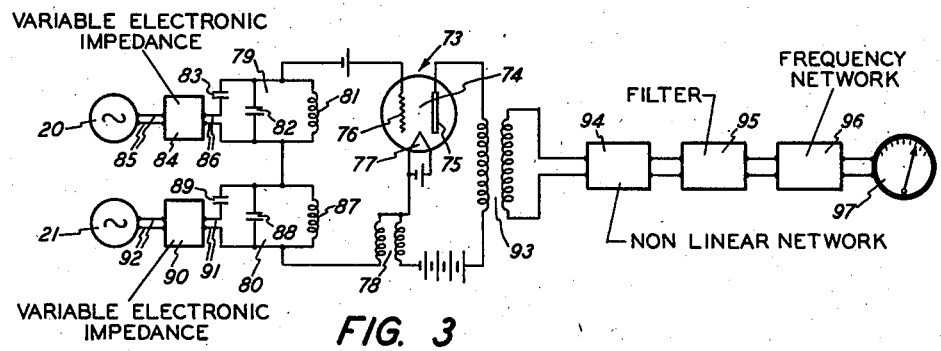
Fig. 3 shows another embodiment of my phase measuring system.

Referring now more particularly to Fig. 3 there is shown a modified arrangement in which in place of two oscillators 22 and 23 a single oscillator 73 is used. The oscillator comprises an ordinary triode tube 74 containing plate 75, grid 76, and filament 77. The plate circuit of the triode is coupled with the grid circuit by means of the inductance 78. The oscillator is provided with two tuned circuits designated respectively by the numerals 79 and 80. The tuned circuit 79 comprises three elements in parallel, the said elements consisting of an inductance 81, a capacitance 82, and a capacitance 83 in series with an electronic impedance designated by the block 84 and described more fully in connection with Fig. 4. The electronic impedance is provided with input terminals 85 and output terminals 86 and is designed in such a manner that the value of the impedance between the terminals 86 is determined by the controlling voltage applied across the input terminals 85. The controlling voltage applied across the terminals 85 is the voltage $e_1 = E \sin \omega_0 t$. Therefore, the impedance 84 varies with the frequency $\omega_0$ in synchronism with $e_1$ and consequently the natural frequency of the tuned circuit 79 varies with the frequency $\omega_0$ in synchronism with $e_1$.

Figure 4:
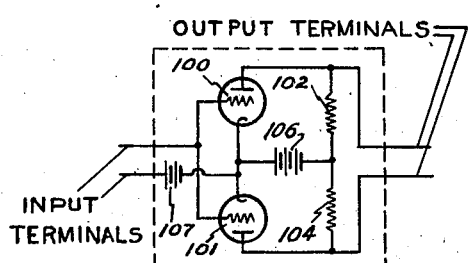
Fig. 4 shows an electronic impedance which is a part of the circuit diagram of Fig. 1 and Fig. 3.

The tuned circuit 80 comprises three elements in parallel, the said elements consisting of an inductance 87 corresponding to 81, capacitance 88 corresponding to 82 and capacitance 89 in series with an electronic impedance designated by the block 90 and described more fully in connection with Fig. 4. The electronic impedance is provided with output terminals 91 connected to the tuned circuit 80 and input impedance 92 connected to the generator 21, the said generator providing the controlling voltage $$e_2 = E \sin (\omega_0 t - \phi)$$

Therefore the natural frequency of the tuned circuit 80 varies with the frequency $\omega_0$ in synchronism with $e_2$. Consequently the frequency variation with respect to time of the tuned circuit 79 is displaced with respect to the frequency variation of the tuned circuit 80 by a time interval $t = \phi/\omega_0$.

The output of the oscillator 73 is transmitted by means of the transformer 93 to the input terminals of a non-linear network 94. The output of the non-linear network is connected to a filter 95 which in turn is connected through a frequency metering network 96 to an indicator 97.

It is apparent that the natural frequency of the tuned circuit 79 is at any instant determined by the controlling voltage $e_1$ applied to the electronic impedance 84 and the natural frequency of the tuned circuit 80 is at any instance determined by the controlling voltage $e_2$ applied to the electronic impedance 90. Since the voltages $e_1$ and $e_2$ are respectively out of phase by an angle $\phi$ the variation of frequency versus time of the tuned circuits 79 and 80 may be diagrammatically represented by means of lines 62 and 63 in Fig. 2.

It is apparent that the oscillator 73 will generate two frequencies one of which is determined by the tuned circuit 79 and the other by the tuned circuit 80. Therefore two signals are being generated in the oscillator 73 and these signals are represented by means of lines 62 and 63 respectively in Fig. 2. These two signals are being transmitted by means of transformer 93 to the non-linear network 94. The non-linear network 94 is of the square law type and is similar to the network 57 described in connection with Fig. 1. The signals represented by the lines 62 and 63 produce in the non-linear network 94 signals that have been described above and have been identified as A, B, C, D. These signals are being transmitted to the filter 95 which is identical to the filter 59 described in Fig. 1. The filter 59 attenuates completely the signals A, B, C and passes only the signal D which is further transmitted to a frequency metering network 96 similar to the one designated in Fig. 1 as 60. In the output of the frequency meter network appear therefore a current the magnitude of which represents the frequency difference between the instantaneous frequencies of the tuned circuits 79 and 80. This current is being indicated on the meter 97. It is apparent that the current indicated on the meter 97 depends upon the phase difference between the voltages $e_1$ and $e_2$ and can be used to indicate the phase difference. It is also apparent that the instrument described in connection with Fig. 3 operates in an entirely analogous manner to the instrument indicated in Fig. 1 and provides an indication of the phase difference between the input voltages $e_1$ and $e_2$.

Figure 4 represents schematically the variable electronic impedance that has been designated by blocks 32 and 52 of Fig. 1 or by the blocks 84 and 90 of Fig. 2. As shown in Fig. 4 the variable electronic impedance comprises two 3 electrode tubes 100 and 101 connected in push-pull, a resistor 102 connected between the anode and the filament of the tube 100, a resistor 104 connected between the anode and filament of the tube 101, and a battery 106 inserted between the cathodes of the tubes 100, 101 and the common terminals of the resistors 102, 104 respectively.

One of the input terminals of the electronic impedance is connected to the grids of the tubes 100, 101 and the other input terminal is connected to the positive terminal of the battery 107, the said battery having its negative terminal connected to the filaments of the tubes 100 and 101. One of the output terminals of the electronic impedance is connected to the plate of the tube 100 and the other output terminal is connected to the plate of the tube 101.

It is apparent that the controlling voltage applied across the input terminals of the electronic impedance in series with the voltage of the battery 107 constitutes the grid bias of the tubes 100 and 101. Consequently the plate resistance of the tubes 100 and 101 depends upon the controlling voltage and by varying sinusoidally the controlling voltage, the plate resistance varies sinusoidally. Therefore the impedance of the circuit contained between the output terminals of the electronic impedance varies with the plate resistance of the tubes 100, 101 and in synchronism with the variation of the said plate resistance.

Consequently, the controlling voltage applied across the input terminals of the electronic impedance determines the value of the electronic impedance and by varying sinusoidally the controlling voltage the electronic impedance between the output terminals varied sinusoidally.

It is therefore apparent that I have provided a means and a method for a precise measurement of phase differences.

I claim:

1. In a method of comparing phases of two alternating electrical signals, the step of translating each of the alternating signals into another signal of a frequency varying in synchronism with the said alternating signal, the said varying frequency being large as compared with the frequency of the said alternating signal, and the step of determining the frequency difference of the two variable frequency signals as an index of the phase conditions of the said two alternating signals.

2. In a method of comparing phases of two alternating electrical signals, the step of producing two electrical oscillations, each of the said oscillations having an average frequency high as compared to the frequency of the said electrical signals, the step of modulating said two oscillations by means of the said two signals so as to vary the frequency of each of the said oscillations in synchronism with the variation of the amplitude of the corresponding electrical signals, and the step of determining the frequency differences between the said oscillations as an index to the phase difference between the said signals.

3. In a method of producing a resultant signal representing phase relationship between two alternating electrical signals, the step of translating each of the alternating signals into another signal of a frequency varying in synchronism with the said alternating signal, the said varying frequency being large as compared with the frequency of the said alternating signal, and the step of combining said two variable frequency signals into a resultant signal, said resultant signal representing said phase relationship.

4. In a method of producing a resultant signal representing phase relationship between two alternating electrical signals, the step of producing two electrical oscillations, each of the said oscillations having an average frequency high as compared to the frequency of the said electrical signals, the step of modulating said two oscillations by means of the said two signals so as to vary the frequency of each of the said oscillations in synchronism with the variation of the amplitude of the corresponding electrical signals, and the step of intermodulating said two oscillations thereby obtaining a modulation product representing said resultant signal.

SERGE ALEXANDER SCHERBATSKOY.

REFERENCES CITED

The following references are of record in the file of this patent:

UNITED STATES PATENTS

| Number | Name | Date |
|---|---|---|
| 2,320,476 | Schrader et al. | June 1, 1943 |
| 2,333,322 | Levy | Nov. 2, 1943 |
| 2,147,810 | Alford | Feb. 21, 1939 |
| 2,259,982 | Alexanderson et al. | Oct. 21, 1941 |
| 1,849,870 | Fitz Gerald | Mar. 15, 1932 |
| 2,247,662 | Newhouse | July 1, 1941 |
| 2,050,418 | Boerner | Aug. 11, 1936 |

FOREIGN PATENTS

| Number | Country | Date |
|---|---|---|
| 314,494 | Great Britain | Sept. 19, 1930 |